US007853030B2

(12) United States Patent
Grasbon et al.

(10) Patent No.: US 7,853,030 B2
(45) Date of Patent: Dec. 14, 2010

(54) METHOD FOR SETTING A HEARING AID, HEARING AID AND MOBILE ACTIVATION UNIT FOR SETTING A HEARING AID

(75) Inventors: Felix Grasbon, Erlangen (DE); Gerhard Sporer, Lauf (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1340 days.

(21) Appl. No.: 11/353,524

(22) Filed: Feb. 14, 2006

(65) Prior Publication Data

US 2006/0182294 A1 Aug. 17, 2006

(30) Foreign Application Priority Data

Feb. 14, 2005 (DE) ........................ 10 2005 006 660

(51) Int. Cl.
*H04R 25/00* (2006.01)
*H04M 1/00* (2006.01)

(52) U.S. Cl. .................................... 381/314; 445/556.1

(58) Field of Classification Search ................. 381/314, 381/315, 322; 455/556.1
See application file for complete search history.

(56) References Cited

U.S. PATENT DOCUMENTS 5,226,086 A * 7/1993 Platt ............................ 381/58
5,604,812 A 2/1997 Meyer
5,721,783 A 2/1998 Anderson
6,470,264 B2 10/2002 Bide
6,870,940 B2 3/2005 Meyer et al.
7,062,233 B2 6/2006 Huttunen

FOREIGN PATENT DOCUMENTS

| | | | |
|---|---|---|---|
| DE | 100 30 915 | A1 | 1/2002 |
| DE | 100 48 341 | C1 | 4/2002 |
| DE | 102 22 408 | A1 | 11/2003 |
| DE | 103 25 804 | A1 | 1/2005 |
| EP | 0 064 042 | A1 | 11/1982 |
| WO | 9855833 | A1 | 12/1998 |
| WO | WO 00/17737 | A1 | 3/2000 |
| WO | 0146926 | A1 | 6/2001 |
| WO | 2004109232 | A2 | 12/2004 |

OTHER PUBLICATIONS

Per Engel: "Retooling the Global Positioning System"; Scientific American; May 2004; 1 abstract page.

* cited by examiner

*Primary Examiner*—Fan Tsang
*Assistant Examiner*—Phylesha Dabney

(57) ABSTRACT

The invention relates to a hearing aid which, with the aid of an integrated positioning unit or a positioning unit integrated in a mobile activation device automatically sets operating parameters of the hearing aid as a function of the location of the hearing aid or of the activation unit.

22 Claims, 4 Drawing Sheets

METHOD FOR SETTING A HEARING AID, HEARING AID AND MOBILE ACTIVATION UNIT FOR SETTING A HEARING AID

CROSS REFERENCE TO RELATED APPLICATIONS

This application claims priority to the German application No. 10 2005 006 660.7, filed Feb. 14, 2005 which is incorporated by reference herein in its entirety.

FIELD OF INVENTION

The invention relates to a hearing aid with an input converter for accepting an input signal and converting it into an electrical signal, a signal processing unit for processing the electrical signal and an output converter for generating an output signal which can be is perceived by a user of the hearing aid as an acoustic signal. Furthermore the invention relates to a method for setting such a hearing aid as well as to a mobile activation unit for automatically setting operating parameters of a hearing aid.

BACKGROUND OF INVENTION

With a hearing aid an input signal is picked up by means of an input converter and converted into an electrical input signal. Usually at least one microphone which picks up an acoustic input signal serves as an input converter. Modern hearing aids frequently comprise a microphone system with a number of microphones so as to achieve reception which depends on the direction of incidence of acoustic signals, a directional characteristic. The input converter can however also include a telephone loop or an antenna to pick up electromagnetic input signals. The input signals converted by the input converter into electrical input signals are routed to a signal processing unit for further processing and amplification. The further processing and amplification is undertaken to compensate for the individual loss of hearing of a hearing aid wearer and is generally a function of the signal frequency. The signal processing unit emits an electrical output signal which is fed via an output converter to the hearing of the hearing aid wearer so that the wearer perceives the output signal as an acoustic signal. Earpieces which generate an acoustic output signal are usually used as output converters. However output converters to generate mechanical oscillations are also known, which directly excite specific parts of the hearing into oscillation, for example the small bones in the ear. Furthermore output converters are known which stimulate the nerve cells of the hearing directly.

A hearing aid is known from EP 0 064 042 B1 with a microphone, a signal processing unit and an earpiece, in which different parameters can be stored in a memory for adapting the signal processing unit to different hearing situations. This means that, for different hearing situations, the hearing aid can be equipped with different hearing programs, between which manual switchover is possible.

A hearing aid is known from U.S. Pat. No. 5,604,812 which features a signal analysis unit for automatic switchover between different hearing programs, said unit detecting the current hearing situation and selecting a suitable hearing program.

A hearing aid with a wired remote control is known from U.S. Pat. No. 5,721,783. The remote control can be connected to a wide variety of sensors and peripheral units to provide solicited and unsolicited information. For example information about the position of a user can be communicated by specially embodied transmitters at specific points in a senior citizens' home or a self-contained, inertial navigation system worn by the user, with gyroscope, acceleration measurement device or compass, or a GPS (Global Positioning System) receiver can be used.

A hearing aid is known from DE 100 48 341 C1 which, to automatically select a hearing program, detects whether it is in the immediate vicinity of an external transmitter. The transmitter creates a transmitter-specific signal, so that different transmitters can be assigned.

In "Retooling the Global Positioning System", Scientific American, May 2004, P. Engel describes how GPS functions and of discusses developments of satellite-assisted positioning systems. D-GPS (Differential GPS) for example allows positions to be accurately determined down to 30 to 50 cm as well as positioning within buildings under certain circumstances.

SUMMARY OF INVENTION

One object of the present invention is to specify a method for setting a hearing aid and to specify a hearing aid for which the tailoring of the signal processing to different hearing areas is improved.

This object is achieved by the claims.

The signal processing of the hearing aid is tailored to different hearing areas within a space by setting at least one parameter which influences the signal processing of the hearing aid. In accordance with the invention a satellite-assisted global positioning system for generating a position signal is provided for this purpose. This is created and evaluated for automatically adjusting the parameter as a function of the position signal.

The inventive method has the advantage that the setting of the parameter is not undertaken manually. It has the further advantage that the setting does not depend on the hearing situation obtaining at the time which is picked up by the input converter. This is especially advantageous if a hearing situation is not automatically uniquely detected and thus the hearing aid is operated with an incorrect parameter. A further advantage lies in the fact that no external transmitter tuned specifically to the hearing aid is used, so that the globally accessible network of satellites for satellite-assisted global positioning will be used. This has an especially advantageous effect on the structure of the hearing aid, since the hearing aid can be embodied either with an integrated satellite-assisted global positioning system in one component or can be operated with and can exchange information with an additional external hearing aid module with a satellite global positioning system. Depending on the embodiment the positioning system communicates information about the position of the integrated unit or of the hearing aid module.

Preferably the positioning signal is transferred continuously or at intervals in pulses. The first method has the advantage that changes in position can take effect on the setting of the parameter immediately, the latter method that less energy is consumed.

In an especially advantageous embodiment the information about the position is determined from the positioning system itself and for example is transmitted in the form of global coordinates to the signal processing unit. This has the advantage of enabling a conventional positioning system to be used. Alternatively there is the option of a type of raw information being communicated to the signal processing unit and the information about the position being extracted there. in this case the requirements imposed on the positioning system are fewer, so that for example an energy saving form of implementation becomes possible. An advantage in this case lies in the fact that the essential computations are executed with only one signal processing unit, and this is the unit of the hearing aid itself, so that the computation can be efficiently controlled and for example only executed on demand.

In one embodiment of the method the setting of the parameter brings about signal processing which is adapted to an acoustic situation in the hearing area. The acoustic situation can for example be determined by acoustic signals which are to be processed optimized. For example in a television room an output signal tailored to the television set is to be generated, in a conference room input signals from people with whom the person is conversing are especially to be processed in the optimum way or on a sports field different hearing programs are to be set at different places.

In a particular embodiment of the method the setting of the parameter is part of a hearing program setting of a hearing program which is especially stored in the signal processing unit of the hearing aid. Accordingly a set of parameters which jointly define the hearing program can be set with the method. A hearing program in this case can be understood as both a fixed amplification profile and also as a functional signal processing continuously adapting to further parameters in its environment.

Preferably at least one of the hearing areas is defined in its one or two-dimensional extent. That means an area of space, for example the living room, or a flat surface, for example a football field, is defined for example with its edge coordinates or via a geometry in relation to a reference point. A setting of the parameter, i.e. a value or a function for example, is then assigned to the hearing area.

The extent of the hearing area can for example be entered with the aid or a programming unit of the hearing aid with reference to global coordinates. As an alternative or in addition, at least one position of the satellite-assisted global positioning system can be stored in order to record the corner coordinates of the football field for example. In buildings it is advantageous to calculate the extent of the hearing area in three dimensions, in order to put into effect different parameter settings on various floors.

In one embodiment of the method, on evaluation of the position signal those of the hearing areas are identified in which a position communicated by the position signal is located, with a value of the parameter assigned for the entire hearing area then being assigned automatically.

In one embodiment of the method the parameter setting is retained until such time as the position signal specifies a position outside the hearing area. Thus for example, on leaving the “television room” hearing area, there can be an automatic switch back to a previously used parameter setting. Alternatively there can be a switch to parameter setting based on an automatic analysis of the hearing situation. Alternatively a parameter setting can furthermore be retained once the user has left a first hearing area until such time as a position signal specifies a position within a second hearing area, so that when a switch is made to this second hearing area the hearing aid is operated with at least one new parameter setting.

In especially advantageous embodiments of the method the position is determined with the global positioning system differentially, i.e. with the aid of a reference unit which notifies runtime errors in the satellite signal. As an alternative to the use of a reference receiver, a runtime compensation based on different influencing of various frequency bands can be computed. Furthermore a greater accuracy can be achieved using what is known as an assisted global positioning system by using signals from the mobile network for example.

In an especially advantageous embodiment of the method, as additional Information when the parameter is set, information about an orientation of the hearing aid in two or three dimensions is taken into account. This can be done for example with a compass and/or an inclination sensor. This has the advantage that for example, with a localized acoustic source, such as for example with a television viewer, the parameter setting can be made dependent on whether visual contact to the acoustic source exists (for example high/low amplification) or whether the user is looking away from the sound source (e.g. low/high amplification).

The embodiment of the hearing aid in which the global positioning system is accommodated in a hearing aid module, has the further advantage for example that the hearing aid module can be stored in a hearing area, to provide the user, despite leaving the hearing area, with the corresponding parameter setting for signal processing. If for example an audio signal of a television is used directly as an input signal, the audio signal can be processed with a parameter adapted to the television viewer even outside the hearing area.

BRIEF DESCRIPTION OF THE DRAWING

Further advantageous embodiments of the invention are identified by the features of the subclaims.

A number of exemplary embodiments of the invention are explained below with reference to FIGS. 1 to 6. The figures show.

DETAILED DESCRIPTION OF INVENTION

Figure 1:
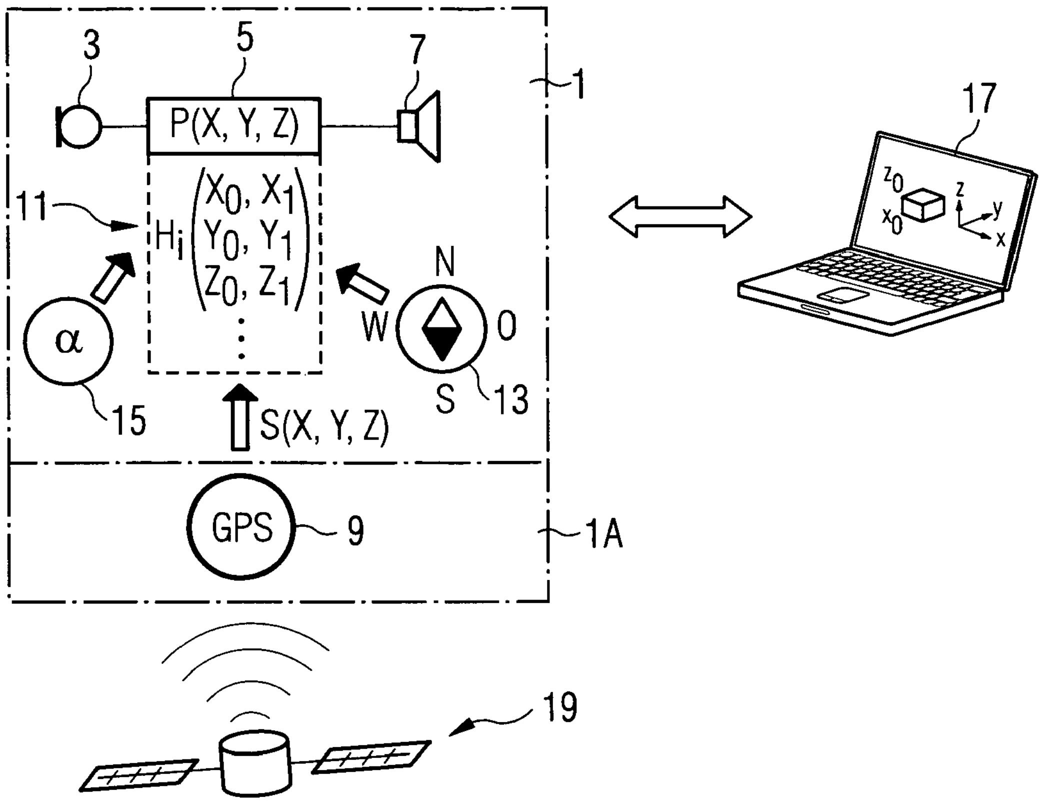
FIG. 1 a schematic diagram of the structure and the operation of an inventive hearing aid, FIG. 2 a sketch to illustrate the concept of hearing areas, FIG. 3 Hearing areas shown using a football field as an example, FIG. 4A hearing area within a building, FIG. 5. a sketch to illustrate the use of sensors for determining the orientation of a hearing aid for the setting of a parameter, FIG. 6 a sketch for illustrating the use of a portable global positioning system or a global positioning system integrated into a mobile phone and FIG. 7 a simplified block diagram of an activation device in accordance with the invention.

FIG. 1 shows a schematic diagram of a hearing aid 1 with an input converter (microphone) 3 for picking up an input signal and converting it into an electrical signal, a signal processing unit 5 for processing of the electrical signal and an output converter (earpiece) 7 for generating an output signal perceived by a user of the hearing aid 1 as an acoustic signal. The signal process is tailored with at least one parameter P to different spatial hearing areas. To this end a satellite-assisted global positioning system 9 is provided which generates a position signal S (X,Y,Z) and communicates it to the signal processing unit 5. The signal processing unit 5 evaluates the position signal S (X,Y,Z) and automatically sets the parameter depending on the position signal S (X,Y,Z).

To this end the signal processing for example features a memory, in which different hearing areas $H_1, \ldots$ are defined in their geometric dimensions and their global positions. The memory unit 11 can in this case also be arranged within the global positioning system 9. The global positioning system 9 can be integrated as a constructional unit 1A into the hearing aid 1 or it can be designed as an independently embodied hearing aid module, in which case it communicates the position signal S (X,Y,Z) to the hearing aid 1 via a cable or wirelessly and/or exchanges information with the hearing aid 1.

The global positioning system 9 receives radio frequency signals from a number of satellites 19 and determines its current position from these signals. The information about the position is communicated as position signal S (X,Y,Z) to the signal processing 5. Additional Information which can have an effect on the setting of the parameter is for example the orientation of the component of the hearing aid 1 on the wearer's head. This is measured for example using a compass 13. In addition or alternatively the orientation can be determined in a vertical plane using an inclination sensor 15. These types of sensor can be integrated without any great effort into a hearing aid 1. Together with the location information of the global positioning system the orientation of the hearing aid and thus for example the direction in which a user of the hearing aid 1 is looking can b e determined and thus set in relation to a sound source of which the spatial position is also known. The acoustic situation thus detected can be evaluated such that, the setting of a parameter can be used to ensure that signal processing is tailored in the optimum way.

The dependent relationship of the parameter to the position signal, i.e. its value at location (X,Y,Z), can for example be entered with a programming unit 17. The programming can for example be undertaken via the normal hearing aid programming interface, for example using a wireless Bluetooth interface. The dependency can also be stored as a functional assignment, so that for example as the distance from a location increases, the amplification is increased by signal processing 5. This corresponds to a parameter setting on the basis of a relative change in the position of the positioning system for a predetermined coordinate. Alternatively for example hearing areas can be defined, i.e. surfaces or volumes can be defined in which a specific value is to be assumed by the parameter. If all parameters of a hearing program are defined for a hearing area, this hearing area is quasi assigned a hearing program. As soon as the user or the positioning system is located within this hearing area, the signals are processed in accordance with the hearing program.

Figure 2:
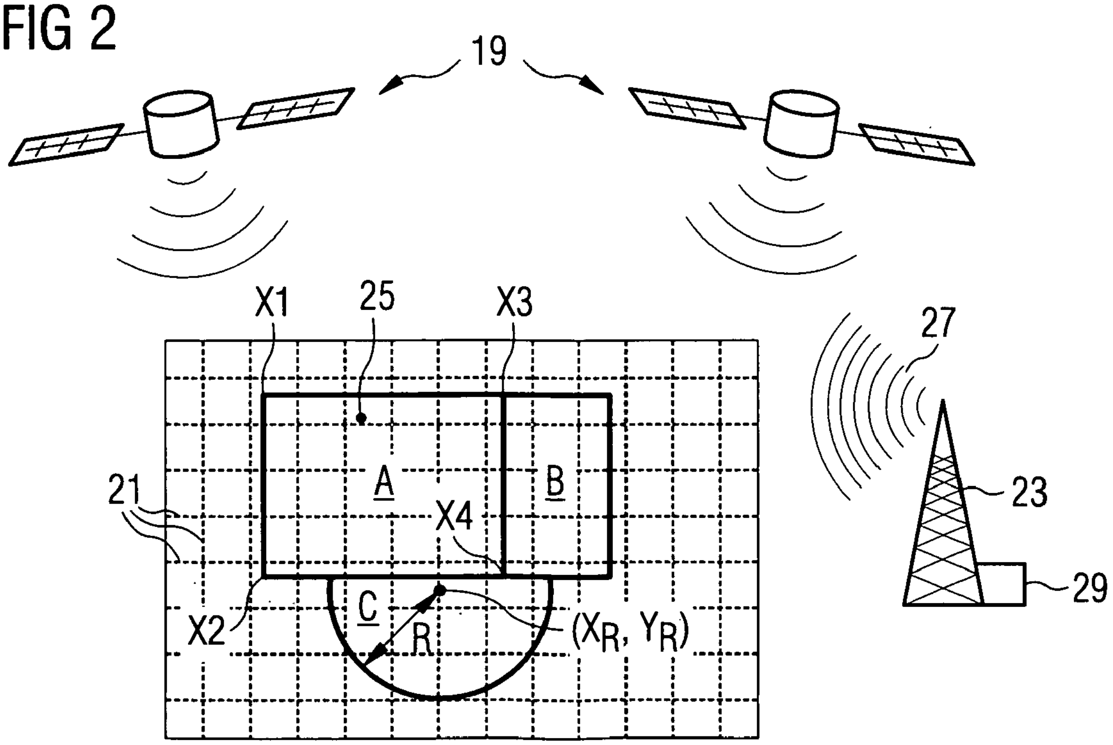

FIG. 2 clarifies the arrangement of flat hearing areas in a coordinate system made up of degrees of length and width 21. For example a rectangular area is determined by the coordinates of the corners X1, X2, X3 and X4. The corner coordinates X3 and X4 are simultaneously corner coordinates of a second hearing area B. A hearing area C is defined by a circle around the point ($X_R$,$Y_R$) with the radius R, with all points within the circle which do not simultaneously lie in the hearing areas A or B being defined as hearing area C.

Furthermore FIG. 2 illustrates a differential positioning with the aid of the satellites 19 and a transmitter 23. The transmitter 23 additionally communicates to a hearing aid 25 (wearer not shown) in accordance with the invention within the hearing area A an error signal 27, with the error signal 27 comprising runtime errors of the satellite signals of the satellites 19. For example the error signal 27 is created with the aid of a satellite-assisted reference global positioning system 29. Because of the fixed position of the external transmitter 23, runtimes with errors can be computed by reconciling the known position of the transmitter 23 with the received signals of the satellites 19. The improvement of the accuracy with the aid of a ground station is also referred to as differential global positioning. However the computation of these types of runtime errors can also be achieved by using different frequency bands. Alternatively a moving receiver can also be included as an auxiliary signal. This is then referred to as a cinematic global positioning system.

Figure 3:
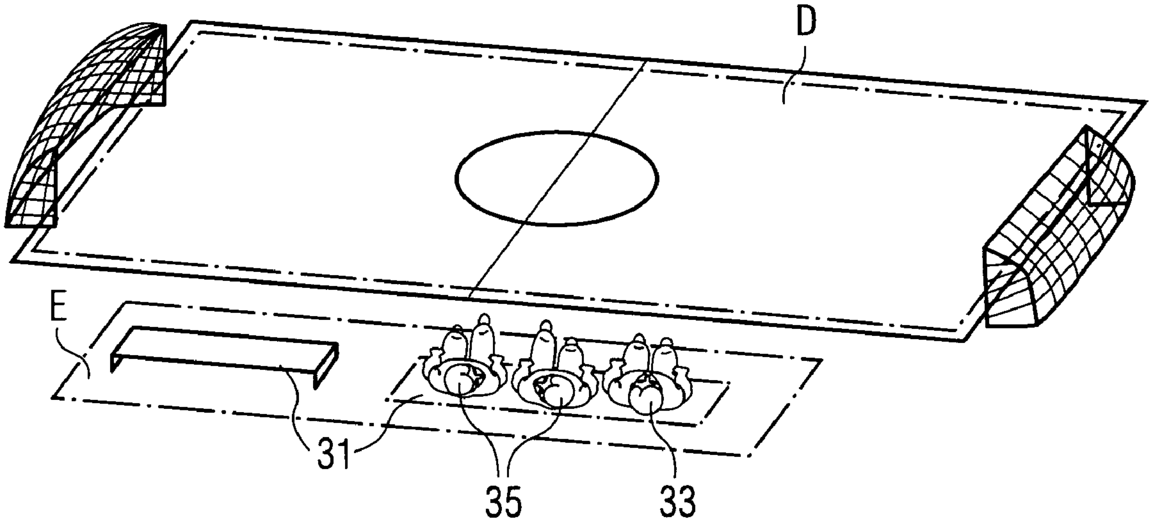

FIG. 3 illustrates the invention using a football field D as an example. The football field D itself is walked around at the beginning of the game, with the positioning system operating in a mode in which the coordinates of the route walked are stored. Alternatively the area D could be entered through four coordinates of the corner posts. If the player (hearing aid user) is on the football field D his hearing device is in football mode. In addition a second area E around the substitutes' bench 31 is defined. For the hearing area E two additional sub hearing programs are defined depending on the alignment of the hearing aid in the space: One is a football watching mode and the other is a conversation mode. With the aid of a compass in the hearing aid on the ear the angle of vision of the user to the football field (head 33) or to a another person being spoken to (head 35) can be determined. Depending on the orientation of the hearing aid on the head, different hearing programs (or settings of parameters) are thus made.

Figure 4:
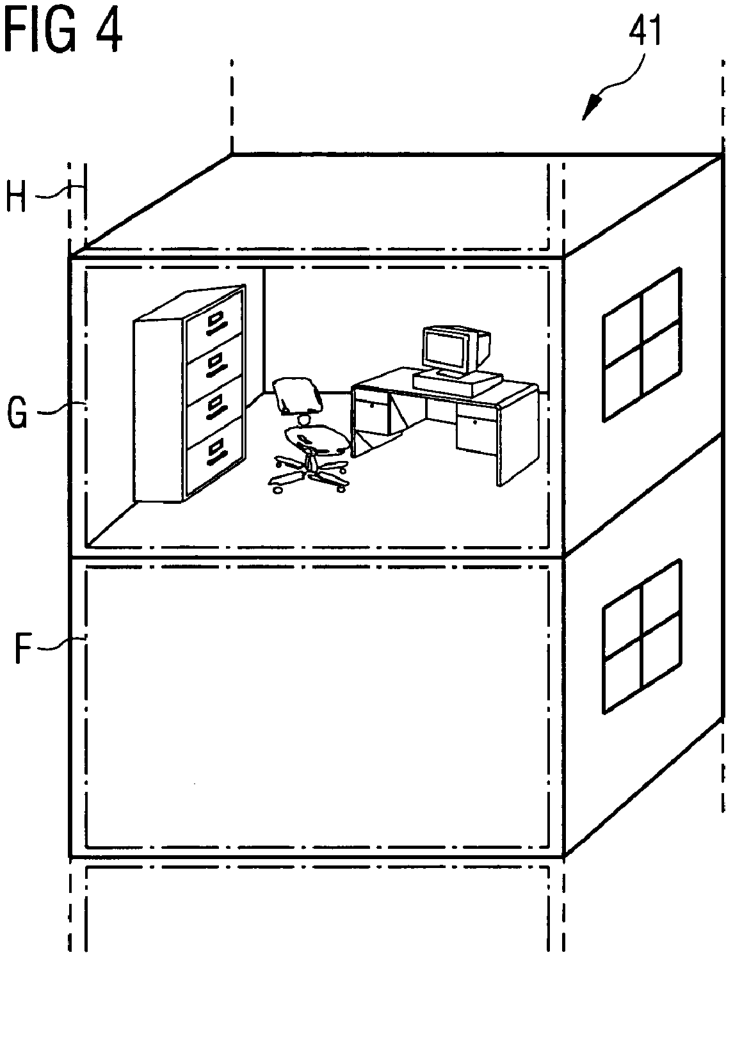

FIG. 4 illustrates the use of three-dimensional hearing areas F, G and H. This is especially of advantage, if within a building 41, hearing areas with lie over one another in the space are to be defined. For example the hearing area F corresponds to the parameter setting in a canteen, the hearing are G to the parameter setting in an office etc.

Figure 5:
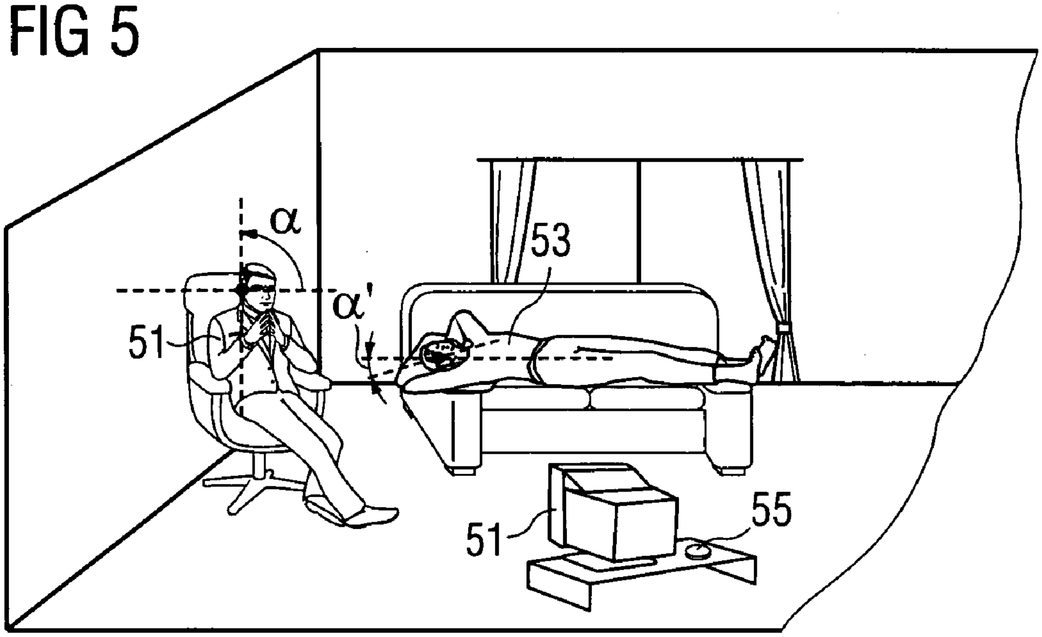

FIG. 5 illustrates the additional use of an inclination sensor in the hearing aid, which can determine the angle of inclination a of the head. The angle of inclination-operates on the setting of a television hearing program which extends in a radius of a few meters around a television set 51. The television hearing program is only set within the hearing area if the user, for example user 51, the television viewer is sitting upright viewing with an angle of head inclination $\alpha$. User 53 on the other hand lies on a sofa, so that the angle of inclination of their head (angle of head inclination $\alpha'$) does not activate the television hearing program. The inclination sensor can operate in conjunction with an electrical compass, so that the users lying on the sofa and watching the television are both hearing in the television hearing program. Preferably in this case minimum intervals of time for picking up certain positions/locations are determined before a setting is made.

FIG. 5 also illustrates that for example user 51 has also put his hearing aid module embodied as a satellite-assisted global positioning system 55 down on a television table. While the positioning system 55 remains lying there, the hearing aid of the user 51 is then also set to television mode, if the user 51 leaves the room.

Figure 6:
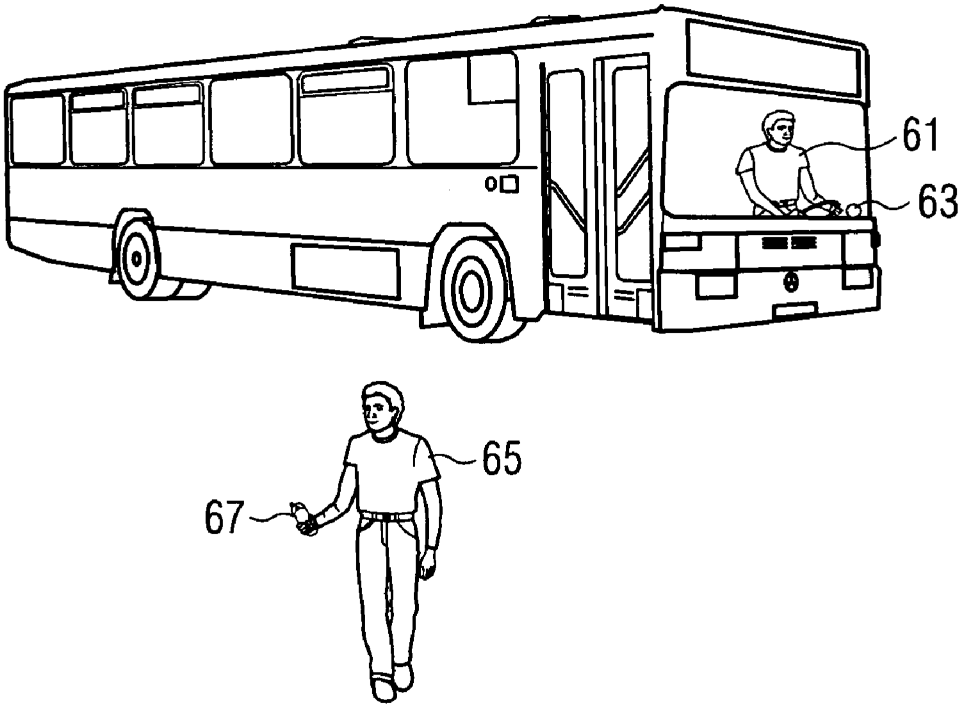

FIG. 6 illustrates two further exemplary embodiments of the invention. Thus a bus driver 61 can use the positioning system 63 to set hearing parameters as a function of the vehicle's speed. The speed is determined with the aid of satellite-based global positioning systems 63 using the frequency shift of the satellite signals. As the speed increases for example the amplification of the hearing aid can be increased to compensate for the wind noise while driving.

In addition FIG. 6 shows a user 65, whose satellite-assisted global positioning system is integrated into a mobile telephone 67. The positioning in the mobile telephone is in this case preferably supported by the telephone network (assisted satellite positioning). Depending on the position the hearing aid is preferably activated by wireless signal transmission from the mobile telephone.

Figure 7:
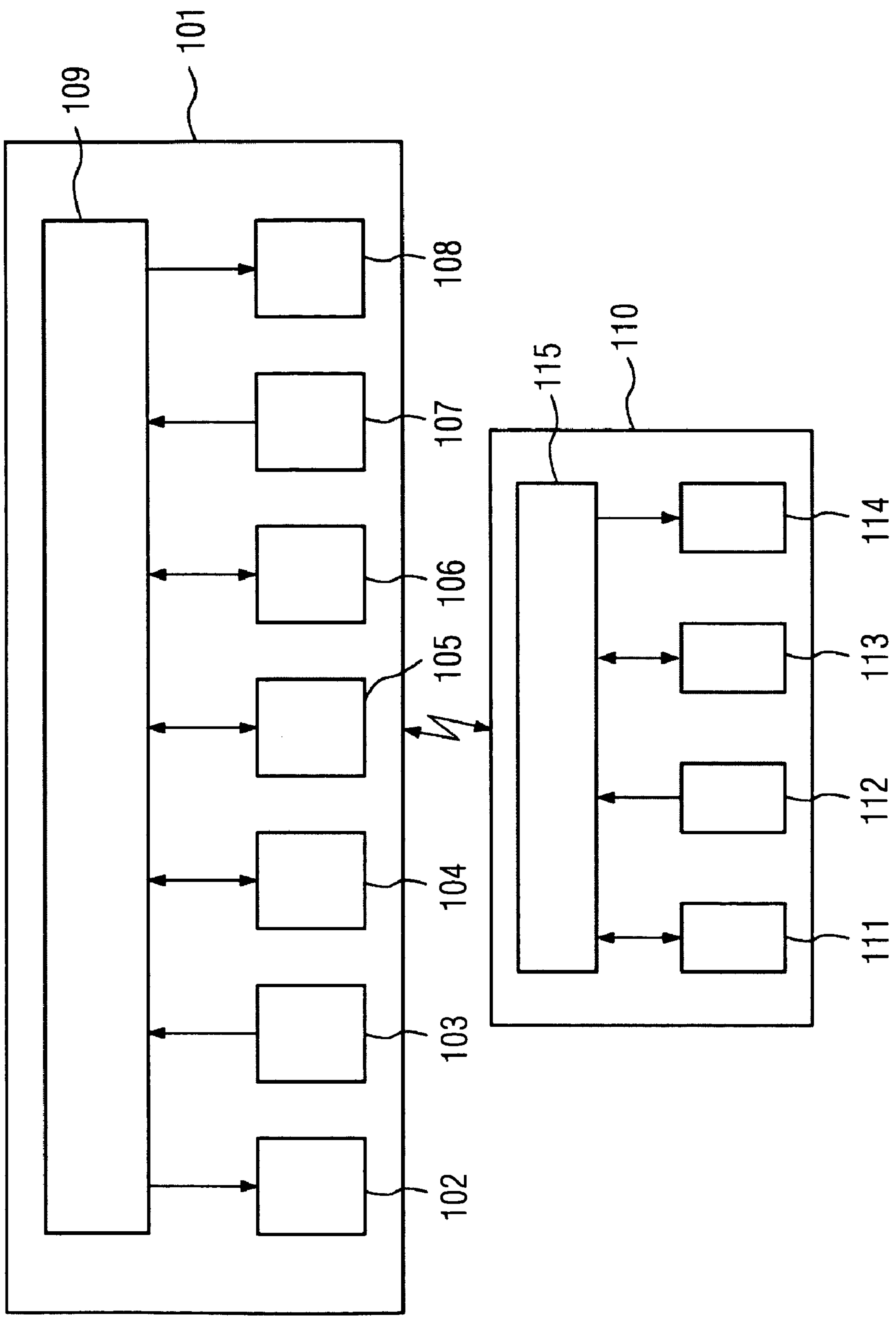

FIG. 7 shows the simplified block diagram of an activation unit 101 in accordance with the invention which can be carried by the user. A display 102 and a keyboard 103 are provided as a user interface. In conjunction with suitable software, this allows data to be entered into the activation device 101 and displayed on it. In addition or alternatively the activation device 101 can also have other input or output means. In the exemplary embodiment the activation device 101 additionally includes a microphone 107 as well as a loudspeaker 108 for voice input and voice output, which makes voice control of the activation device possible as well. This is for example automatically present in any event with integration into a mobile telephone. The activation device 101 can further also be integrated into a remote control of the hearing aid.

For determining the current position of the activation device 101 this device is advantageously equipped with a AGPS (Assisted Global Position System) receiver 104. This allows the current position to be precisely determined to within one meter. Positioning is undertaken in real time in this case or at least very close to real time so that the current position of the activation device 101 is always available and movements of a person wearing the activation device 101 can be recorded. The activation device 101 further has storage means 105 available in which the spatial coordinates of preferred roaming areas of the user can be stored. For example the coordinates of differ ent preferred rooms of a building which the user likes to frequent can be stored in the memory 105. In addition data for controlling a hearing aid can be stored in the memory 105 with different data being able to be assigned to different spatial areas in the memory 105. The activation device 101 also has facilities via an interface 106 for wireless data exchange with the device concerned. Data transmission preferably complies with the Bluetooth standard in such cases.

All major components of the activation device 101 are connected to a signal processing and control unit 109. This controls the signal transmission between the individual components of the activation device 101 and looks after the signal processing of all relevant data. The data received from the AGPS receiver 104 in particular is edited and evaluated in the signal processing and control unit 109.

The activation device 101 is used for the general control of a controllable hearing aid 110. In this case the controllable hearing aid 110 is also worn by the user of the activation device 101. The activation device 101 can additionally be set up to control a plurality of different controllable devices. To this end it can be programmed in an appropriate manner for controlling the different devices.

In the signal which is transmitted from the activation device 101 to the controllable hearing aid 110 there is provision for inclusion of at least one control command for the controllable hearing aid 110. The control command can for example effect a switch in the controllable hearing aid 110 from a first sequential program to a second sequential program. The transmitted signal can however also include direct parameter settings which are stored after transmission in the controllable hearing aid 110 and from this time on influence the signal processing in the controllable hearing aid 110. In addition it is also possible for a number of different sequential programs of the controllable hearing aid 110 to be stored in the activation device 101 and depending on the current spatial position of the activation device 101, for a specific sequential program to be selected and transmitted to the controllable hearing aid 110 and to subsequently determine the program sequence in the controllable hearing aid 110.

In one embodiment of the invention there is provision for the activation device 101 to only influence the signal processing of the controllable hearing aid device 110 while a signal is being transmitted continuously or repeatedly within a specific period of time from the activation device 101 to the controllable hearing aid 110. This embodiment has the advantage that the controllable hearing aid 110 will be operated in a predefined state if the connection between the activation device 101 and the controllable hearing aid 110 is interrupted.

The invention offers the advantage that no other intermediate devices are necessary between the activation device 101 and the controlled hearing aid 110. Data is transmitted directly between the activation device 101 and the controlled hearing aid 110.

The function of the hearing aid 110 can depend on other parameters as well as on the location of the user. This includes for example parameters which can be derived from an evaluation of the signal received from the AGPS receiver of the activation device 101. This encompasses for example determining a movement of the user, the direction of movement or speed of the user. In addition the control of the controllable hearing aid 110 can also depend on parameters which do not depend on the user's current location. These types of parameter are for example the time of day, the day of the week, the angle of inclination or the ambient temperature. In addition an activation device 101 can also be used by a number of users, with advantageously different user profiles being able to be stored. The controllable hearing aid 110 is then also controlled as a function of which user is currently carrying the activation device 101, i.e. which user profile is activated.

The orientation of the activation device 101 in the room can also serve as a further parameter in addition to the current location of the user. For example a vertical carrying position of an activation device 101 attached to a belt clip can be detected, with control of the controllable hearing aid 110 being activated by the activation device 101 in this position. If the activation device 101 is in a horizontal orientation on the other hand, this indicates that the user is in a lying position or that the activation device 101 has been put down, at which point the control of the controllable hearing aid 110 by the activation device 101 is deactivated.

Which position-dependent settings for the hearing aid are set by means of the activation device 101 is determined by corresponding programming of the activation device 101. Corresponding entries are made in the activation device 101 in this case using the available interfaces (keyboard 103, Bluetooth interface 106 etc.). The control procedures to be executed can also be entered conveniently via an external unit (not shown), e.g. a PC, into the activation device 101, especially by means of the Bluetooth interface 106. Furthermore the activation device 101 can also include wired interfaces for connection to an external device for programming.

The programming of the activation device 101 via an interface allows different spatial position data of different settings to be assigned for the hearing aid 110. The signal processing and control unit 109 continuously checks whether a relocation of the user and thereby of the activation device 101 is to cause operating parameters of the controllable hearing aid 110 to change. This is especially undertaken by performing a permanent comparison of the settings assigned to the different areas with the current position. If, because the activation device 101 has changed location, there is provision for a change to at least one operating parameter of the controllable hearing aid 110, a corresponding signal is generated by the activation device 101 and transmitted via the Bluetooth interface to the controllable hearing aid 110. For this purpose the device features an interface suitable for wireless reception of the control signal, especially a Bluetooth transceiver unit 111. The signal processing in the signal processing and control unit 15 can be set via specific parameters, which are typically held in a program memory 113, and define the choice of program and the volume setting for example.

The Figures illustrate the extremely flexible assignment of spatial areas to settings of parameters. New areas can be defined at any time and without further aids. Preferably the hearing aid includes a button which stores the current coordinates, orientation and/or inclination. On the basis of these coordinates the user can be offered different geometries which he can then assign to the different coordinates in order to define the hearing area. He can thus define a hearing area through a number of coordinates, and assign to it a speed interval, a minimum speed and/or a direction at a location.

The invention claimed is:

1. A method for adjusting a hearing aid having:

an input converter for acquiring an input signal and converting the input signal into an a electrical signal;

a signal processing unit for processing the electrical signal; and an output converter for generating an output signal, the output signal perceivable by a user of the hearing aid as an acoustic signal, wherein at least one parameter being is adjustable for adapting the signal processing unit to a plurality of spatial hearing areas, the method comprising:

providing a satellite-assisted positioning system for generating a position signal related to the hearing aid;

generating the position signal by the positioning system;

evaluating the position signal; and automatically adjusting the parameter based on the evaluated position signal.

2. The method in accordance with claim 1, wherein the positioning system:

forms an integral part of the hearing aid; or is embodied as an external hearing aid module and configured to transmit the position signal having information about a current position of the hearing aid respectively the hearing aid module.

3. The method in accordance with claim 1, wherein the position signal is transmitted continuously or at intervals.

4. The method in accordance with claim 1, wherein the information about the current position is obtained from the position signal within the positioning system or within the signal processing unit.

5. The method in accordance with claim 1, wherein adjusting the parameter is part of a hearing program setting stored in the signal processing unit of the hearing aid.

6. The method in accordance with claim 1, wherein at least one of the hearing areas is defined by its two-dimensional or three-dimensional extent, and adjusting the parameter is related to the at least one hearing area.

7. The method in accordance with claim 6, wherein the extent of the hearing area is defined using a programming unit of the hearing aid based on coordinates.

8. The method in accordance with claim 6, further comprising storing coordinates related to a position of the positioning system at a plurality of locations upon defining the extent of the hearing area.

9. The Method in accordance with claim 1, wherein, upon evaluating the position signal, such hearing area is identified including a position corresponding to the position signal, and the parameter is adjusted to adapt the signal processing unit to the identified hearing area.

10. The method in accordance with claim 1, wherein a current setting of the parameter is maintained until the evaluated position signal corresponds to a position outside such hearing area corresponding to the current setting of the parameter.

11. The method in accordance with claim 1, wherein adjusting the parameter is also based on information about an orientation of the hearing aid relative to two or three dimensions.

12. The method in accordance with claim 11, wherein the orientation of the hearing aid is detected by a compass or an inclination sensor.

13. A hearing aid, comprising:

an input converter for acquiring an input signal and converting the input signal into an a electrical signal;

a signal processing unit for processing the electrical signal;

an output converter for generating an output signal, the output signal perceivable by a user of the hearing aid as an acoustic signal, wherein at least one parameter being is adjustable for adapting the signal processing unit to a plurality of spatial hearing areas;

a satellite-assisted positioning system connected to the signal processing unit for generating and for transmitting a position signal related to the hearing aid; and a control unit for automatically adjusting the parameter based on the position signal.

14. The hearing aid in accordance with claim 13, wherein the satellite-assisted positioning system is an external functional module integrated into a mobile telephone or into a hearing aid remote control.

15. A mobile activation device for automatically adjusting operating parameters of a hearing aid located in a vicinity of the activation device based on a spatial position the activation device, the activation device comprising:

a first memory for storing spatial position data;

a second memory for storing operating parameters of the hearing aid;

a control unit for assigning the spatial position data to the stored operating parameters;

a localization unit for detecting whether the activation device is located within a spatial area corresponding to the spatial position data; and a transmitter for wirelessly transmitting a signal from the activation device to the hearing aid based upon such operating parameters corresponding to the spatial position data.

16. The mobile activation device in accordance with claim 15, wherein the localization unit includes a satellite-assisted positioning system (GPS).

17. The mobile activation device in accordance with claim 15, wherein the signal transmitted from the activation device to the hearing aid includes a control command, a hearing aid settings or a hearing aid program.

18. The mobile activation device in accordance with claim 15, wherein a current spatial position of the activation device is detected relative to a two-dimensional or three-dimensional coordinate system.

19. The mobile activation device in accordance with claim 15, wherein the activation device is moved with a user, a direction of movement or a speed of the movement is determined, and the signal transmitted from the activation device to the hearing aid is based on the direction of movement or the speed.

20. The mobile activation device in accordance with claim 15, wherein the signal transmitted from the activation device to the hearing aid is based on the time of day, on an ambient temperature, on an ambient brightness or on a user profile.

21. A method for automatically setting operating parameters of a hearing aid located in a vicinity of a mobile activation device based on a spatial position of the activation device, the method comprising:

storing spatial position data in the activation device;

storing data related to setting the operating parameters in the activation device;

assigning the data related to setting the operating parameters to the spatial position data;

automatically detecting whether the activation device is located within a spatial area corresponding the spatial position data;

wirelessly transmitting a signal from the activation device to the hearing aid based on the assigned data if the activation device is located with the spatial area corresponding to the spatial position data;

receiving the signal by the hearing aid located in the vicinity of the activation device; and setting the operating parameters of the hearing aid based on the received signal.

22. The method in accordance with claim 21, further comprising:

placing the activation device at a fixed location during a time period; and moving the hearing aid relative to the activation device at least during the time period.

* * * * *